US006853455B1

(12) United States Patent
Dixon et al.

(10) Patent No.: US 6,853,455 B1
(45) Date of Patent: Feb. 8, 2005

(54) APPARATUS AND METHODS FOR FOURIER SPECTRAL ANALYSIS IN A SCANNING SPOT MICROSCOPE

(75) Inventors: Andrew Dixon, Great Haseley (GB); William Bradshaw Amos, Cambridge (GB)

(73) Assignee: Bio-Rad Laboratories, Inc., Hercules, CA (US)

( * ) Notice: Subject to any disclaimer, the term of this patent is extended or adjusted under 35 U.S.C. 154(b) by 0 days.

(21) Appl. No.: 09/647,616

(22) PCT Filed: Apr. 1, 1999

(86) PCT No.: PCT/GB99/01022

§ 371 (c)(1),
(2), (4) Date: Oct. 2, 2000

(87) PCT Pub. No.: WO99/52005

PCT Pub. Date: Oct. 14, 1999

(30) Foreign Application Priority Data

Apr. 3, 1998 (GB) .............................. 9807257

(51) Int. Cl.[7] .................................. G01B 9/02
(52) U.S. Cl. ...................... 356/453; 356/491
(58) Field of Search ............... 356/451, 453, 356/491, 511, 492, 495, 455

(56) References Cited

U.S. PATENT DOCUMENTS 4,905,169 A    2/1990  Buican 5,117,466 A    5/1992  Buican
5,457,536 A   10/1995  Kornfield

FOREIGN PATENT DOCUMENTS

WO    WO 94/18593    8/1994
WO    WO 97/23649    7/1997

OTHER PUBLICATIONS

Patent Abstracts of Japan, vol. 097, No. 008, Aug. 29, 1997 & JP 09 096764 A (Olympus Optical Co Ltd), Apr. 8, 1997, see abstract.

*Primary Examiner*—Zandra V. Smith
*Assistant Examiner*—Andrew H. Lee
(74) *Attorney, Agent, or Firm*—M. Henry Heines; Townsend and Townsend and Crew LLP

(57) ABSTRACT

A scanning spot microscope for performing a Fourier spectral analysis has means for performing a repeatable scanning operation which includes scanning an incident light spot to successive locations of a specimen. An interferometer is placed across an optical light path of the microscope, the interferometer including a birefringent device between polarizing devices in the path and introducing a given path difference. Means are provided for receiving and recording an optical signal due to the incident light spot from each successive specimen location. In use the given path difference is maintained during each scanning operation but is varied between scanning operations so that the optical signals relating to these specimen locations and the values of the given path difference can be recorded.

6 Claims, 4 Drawing Sheets

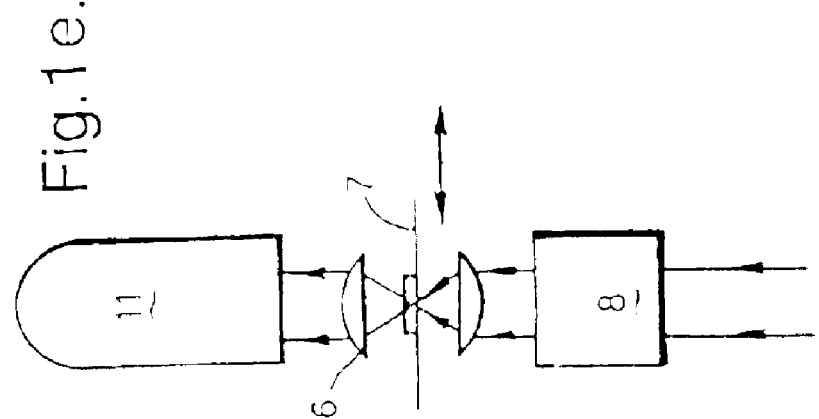
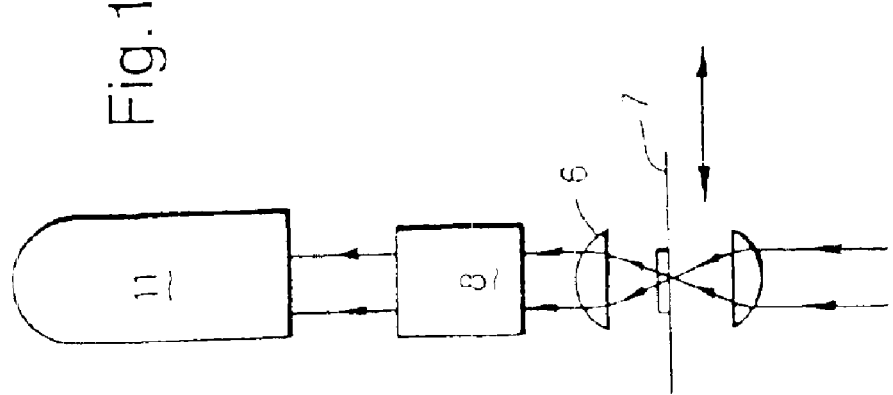
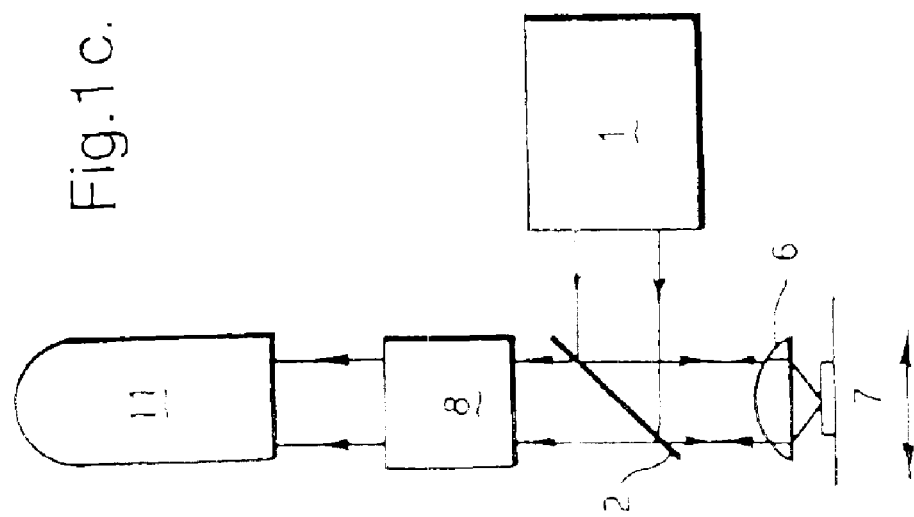

APPARATUS AND METHODS FOR FOURIER SPECTRAL ANALYSIS IN A SCANNING SPOT MICROSCOPE

FIELD OF THE INVENTION

This invention relates to a scanning spot microscope including apparatus for Fourier spectral analysis and methods for operating it.

BACKGROUND OF THE INVENTION

Optical microscopes in which a point or, more exactly, a very small volume (say 1 $\mu m^3$ or less, e.g. of the order of 0.01 $\mu m^3$) of the specimen is illuminated at any one time have been developed for a number of different optical imaging methods, including confocal epifluorescence imaging (White, U.S. Pat. No. 5,032,720) and multiphoton imaging (Denk, Strickler and Webb, U.S. Pat. No. 5,034,613). Some of these methods are reviewed in the *Handbook of Biological Confocal Microscopy*, edited by James B. Pawley, Second Edition, Plenum Press (1995). In the case of a so-called scanning spot microscope, an image is built up by scanning the illumination spot over the specimen or by scanning the specimen relative to a stationary spot, some portion of the emitted or reflected radiation being measured over a period of time and used to determine the intensity of the image at each point. In an alternative form, a broad area of the specimen is illuminated and it is the photometric area or volume which is scanned. The latter scheme is particulary applicable to microdensitometry at single or multiple optical wavelengths. As described in the *Handbook of Biological Confocal Microscopy*, such instruments have found widespread application, particularly in biological studies using confocal or multiphoton epifluorescence microscopy where the intensity of the measured light is often very low. In such a situation, loss of light in filters or monochromators, which are frequently used to isolate light of specific wavelengths before passage to the detector, is a serious problem.

In the field of astronomical spectroscopy a method for analyzing the spectral composition of the light is described by L. Mertz (Spectrometre Stellaire Multicanal. *Le Journal de Physique et le Radium Vol.* 19, 233–235, 1958). Mertz refers to two advantages of his apparatus. First, insofar as it is a Fourier interferometric device, it is superior to a monochromator. This is a reference to the well-known fact that in a monochromator light is wasted on the jaws of the exit slit, whereas in an interferometer all photons of light are potentially detectable. Secondly, he states that his apparatus, which depends on the use of birefringent components, is superior in robustness and simplicity to the alternative of a Michelson interferometer.

At first sight, an objection to Mertz's apparatus is that since it requires a polarized input, at least half of the intensity of the incident light is sacrificed. However, Mertz introduces a principle which might be termed "full-polarization usage". The input starlight is passed through a Wollaston prism which acts as a polarizing polarising beamsplitter, dividing the input into two beams with mutually perpendicular polarizations with minimum wastage of light. The two beams pass through the polarizing interferometer in such a way that two complementary interferograms are obtained, both of which are used for subsequent analysis. This feature has been further developed by W. M. Sinton who incorporates two Wollaston prisms respectively as polarizing beamsplitter and combiner (W. M. Sinton, Recent Infrared Spectra of Mars and Venus, *Journal of Quantitative Spectroscopy and Radiation Transfer*, Vol 3, 551–558, 1963). The methods of Mertz and Sinton both depend on making series of measurements of the intensity produced by the polarizing interferometer at different settings of optical path difference between two beams (the two being produced as a result of the birefringence in the optical materials). Such a series of measurements, called an interferogram, is then subjected to an inverse Fourier transformation according to well-established practice, to yield the optical spectrum of the incident light.

Prior art also exists describing the application to a microscope of birefringent apparatus for Fourier spectral analysis. Minami (S. Minami, Fourier Transform Spectroscopy using Image Sensors, Mikrochimika Acta [Wien], III, 309–324, 1987) describes an apparatus in which light from a restricted region of a microscope specimen passes through a slit-shaped aperture and is then allowed to pass through birefringent components such that a complete interferogram is instantaneously produced in a camera.

Buican and Martin (U.S. Pat. No. 4,905,169) disclose a polarizing interferometer for use with a flow cytometer. Their interferometer incorporates the use of two polarizing beamsplitters to achieve maximum use of signal photons, as per Mertz and Sinton, but employs a modulatable birefringent device. This last feature allows a complete interferometric scan (i.e. over a range of optical path differences) to be performed in 0.01 to 0.1 millisecond such that a full spectrum can be obtained within the very short passage time of a single cell through the laser beam in the flow chamber.

The prior art works well, but none of it is directed towards the application of interferometry and Fourier spectral analysis to scanning spot microscopy. Mertz and Sinton restrict themselves to astronomical spectroscopy, where the particular problems of scanning spot microscopy are not encountered. Minami does not envisage any sort of scanning arrangement, and his apparatus is not suitable for use with a photomultiplier, which is the preferred form of detector for scanning spot microscopy because of its good response to weak, rapidly-varying signals. Buican is not concerned with imaging and consequently his apparatus is not adapted to scanning spot microscopy. In a later patent (U.S. Pat. No. 5,117,466) Buican and Yoshida describe the application of the same type of interferometer to a laser scanning epifluorescence microscope, preferably a confocal microscope, as part of a system also including a flow cytometer. The method described by Buican and Yoshida for scanning-spot microscopy requires a rapidly-oscillating crystalline element in order to produce a complete interferogram during the pixel dwell time (i.e. the time taken for a region of the specimen corresponding to one picture element in the final image to be scanned). In the present application the method is different: each interferogram is collected by repeated scanning over the same spot at different settings of optical path difference. This slower procedure permits the use of different apparatus with several advantages, in addition to lower cost.

SUMMARY OF THE INVENTION

According to the invention there is provided a scanning spot microscope for performing Fourier spectral analysis which has (i) means for performing a repeatable scanning operation which includes scanning an incident light spot to successive locations of a specimen, (ii) an interferometer placed across an optical light path of the microscope, the interferometer including a birefringent device between polarizing devices in the path and introducing a given path difference and (iii) means for receiving and recording an optical signal due to the incident light spot from each specimen location, wherein, in use, the given path difference is maintained during each scanning operation but is varied between scanning operations, such that the optical signals relating to the specimen locations and the values of the given path difference are recordable. As a result, a spectral analysis relating to each specimen location can be performed.

The interferometer may be placed either in the light path to the specimen or in the light path from the specimen to the detector. Although the interferometer itself may be a non-imaging device, the scanning spot microscope can produce an image by linear or raster scanning over the specimen and by photometric recording of the changes in the emitted, transmitted, reflected or fluorescently emitted light or other light signal derived from the spot over a period of time.

The invention also provides a method of performing Fourier spectral analysis in which an incident light spot performs a repeatable scanning operation which includes being scanned to successive locations of a specimen, a birefringent device between polarizing devices introduces a given path difference into an optical path of light incident to or received from the specimen, the given path difference is maintained during each scanning operation but is carried between scanning operations, and the optical signals relating to the specimen locations and the values of the given path difference re recorded. As a result a spectral analysis relating to each specimen location can be performed.

In a preferred method of performing Fourier spectral analysis, an image relating to a particular given value of the optical path difference is stored, the optical path difference in the interferometer is then changed by a known increment and a new image is recorded. In this way a series of images, or a series of linear scans, is recorded. By subsequent inverse Fourier transformation of the image data, which may be performed off-line, spectral information is obtained which is specific for each pixel in a two-dimensional image, or for each pixel along a linear scan line.

A preferred form of interferometer, which is suited to low-light-level conditions, has a polarizing beamsplitter (of which the preferred version is a cube polarizing beamsplitter of the dielectric type) placed in the path of the input light. This beamsplitter functions to divide the input beam of light into two beams of mutually perpendicular polarization, both of which enter the interferometer. As a result, incoming light having any direction of polarization is transmitted into the interferometer with minimum loss. After passage through the birefringent device both beams pass through a second polarizing beamsplitter, used in this case as a beamcombiner. In this preferred form of the interferometer the two beams passing through the interferometer define a rectangular shape, in which one vertex corresponds to the point of separation of the beams and the opposite vertex to their point of recombination. There are two exit paths for the light, which are directed into two detectors, preferably photomultipliers. This design allows the total optical efficiency to approach 100%.

Optionally included in this preferred form of the interferometer is a modified Soleil compensator, in which a wedge of birefringent material is translated relative to fixed path-defining optics. In the modified Soleil compensator the optical slow direction of the birefringent wedge is at an angle of 45° to its direction of translation, instead of being in the usual orthogonal direction. This advantageously allows the optical path difference between differently-polarized components in opposite and parallel legs of the rectangular beam path to be the same for all positions of the wedge, which is translatable in a direction normal to the plane of the rectangle. An efficient interferometer is thereby obtained, since all the input light is subjected to the same optical path difference and contributes to two complementary interferograms which are constructed from a series of measurements taken in the two photomultipliers.

An interferometer including a Soleil compensator is most preferred and has an advantage that the optical path difference in the interferometer is highly stable, since it depends on the intrinsic birefringence and dimensions of optical components which are not sensitive to electronic or environmental variables. However, other optical designs are also possible, and those with similarly stable optical components have this advantage. For example, the polarizing beamsplitters may be Wollaston prisms, Rochon prisms, or Savart plates which might be preferred on the grounds of their greater operational range of wavelength. However, modern improvements in dielectric cube beamsplitters make them preferable for the economical manufacture of large-aperture devices. Other means of varying the optical path, instead of a Soleil compensator, include a Berek, Babinet or other type of compensator. Preferably, the interferometer is adjusted by the application of motorized translation or rotation to otherwise passive polarizing optics such that the interferometer can be held at a constant optical path difference over a period extending up to an imaging time of greater than one second. Other forms of interferometer using electro-optical, photoelastic, liquid crystal or other principles to vary the optical path are also envisaged but are less preferred and are less likely to provide a stable optical path difference.

The method of performing Fourier spectral analysis can make use of the image-acquisition and storage means of most current commercially-available scanning spot microscopes with little or no modification. Therefore the interferometer may be an attachment or accessory which can be coupled to an existing scanning spot microscope. The attachment may be effected by optical fibers or other optical means.

Optionally, a marker or markers may be provided on one or more moving optical components (e.g. on a moving component of a Soleil compensator) to allow calibration of the interferometer. The position of the marker or markers can be used to indicate the amount of optical path difference introduced by the interferometer. The position of the marker may be sensed by optical, mechanical, electronic or other means.

In preferred forms of the interferometer the birefringent material of the Soleil compensator or equivalent device is quartz or calcite. Rutile may also be used, but quartz and calcite are cheaper and suffice in the majority of applications of the invention because transmission of wavelengths greater than two micrometers is seldom required in scanning optical microscopy.

DESCRIPTION OF PARTICULAR EMBODIMENTS

Further features and advantages of the invention will be apparent from the following description of embodiments, making reference to the accompanying drawings, in which:

FIGS. 1a, 1b, 1c, 1d and 1e show schematically examples of scanning spot microscopes and various ways in which an interferometer may be incorporated into them. For simplicity, single detectors are shown in diagrams, although in the microscopes at FIGS. 1a–1d a pair of detectors may be used.

Figure 1A:
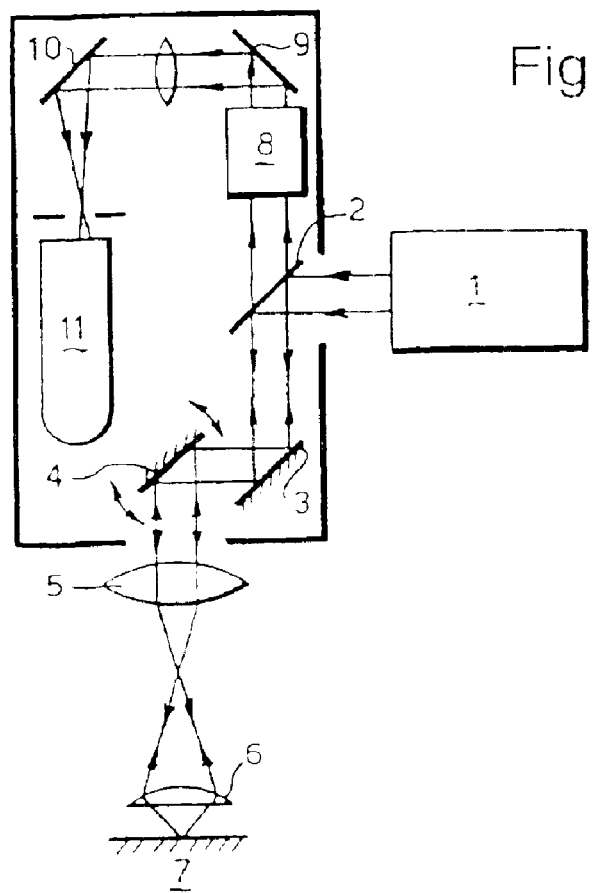

In FIG. 1a an epi-fluorescence or epi-reflection microscope is shown, in the form frequently used for confocal microscopy. Light from a laser 1 is reflected off a chromatic reflector 2 and passes to a reflector 3 and thence to a scanning system symbolized by a single oscillating reflector 4. From the scanning system the now-moving beam is passed through a microscope consisting of an eyepiece lens 5 and an objective lens 6. Light from a small spot which is scanned raster-fashion across a specimen 7 returns from the optical path to the reflector 2 becoming a stationary or descanned beam on passing back through the scanning system. The reflector 2 allows a portion of the stationary signal beam to pass through an interferometer 8 which introduces a given path difference and thence via reflectors 9 and 10 into detector 22. The stationary and relatively well-collimated nature of the beam makes it suitable for passage through the interferometer at the location shown. The signals received by the detector 22 are recorded and a Fourier spectral analysis relating to each specimen location of the faster is performed.

Figure 1B:
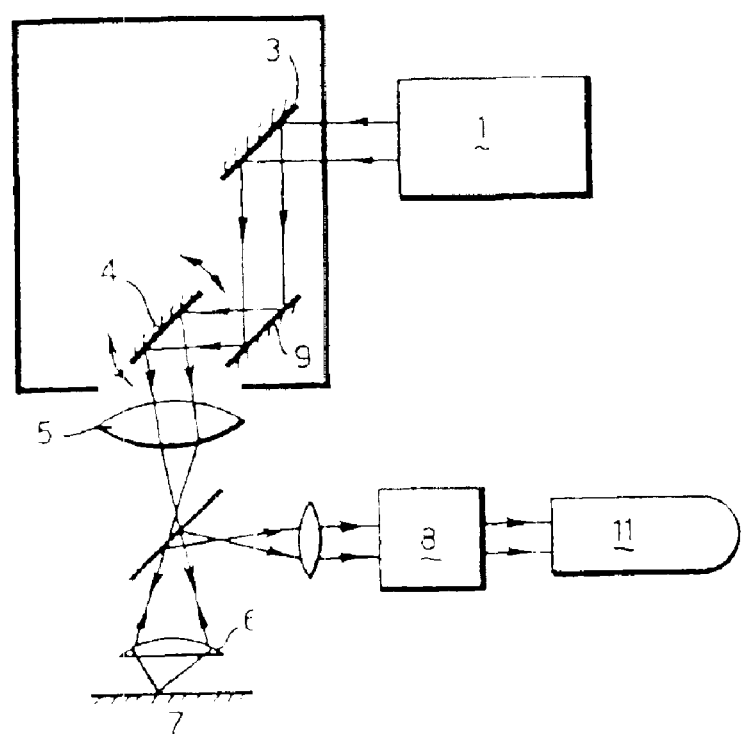

FIG. 1b shows a general layout preferred for multiphoton fluorescence microscopy. Here the interferometer 8 is inserted into a non-descanned signal pathway leading to a detector 11 without repassage through the scanning system.

FIGS. 1c, 1d and 1e show scanning spot microscopes in which the spot and optics are stationary, the image being built up during scanning motion imparted to the specimen 7. FIG. 1c shows an epi-reflection or epi-fluorescence microscope and FIG. 1d shows a transmission microscope. In both of these, the interferometer 8 is inserted into the path leading from the specimen to the detector 11. FIG. 1e shows a transmission microscope in which the interferometer 8 is alternatively inserted into the illumination path before the bear reaches the specimen.

The transmission microscopes of FIGS. 1d and 1e are best suited to the measurement of absorption spectra in the transmission image, but other uses, such as spectral analysis of dark field images, are also possible with them.

Figure 3:
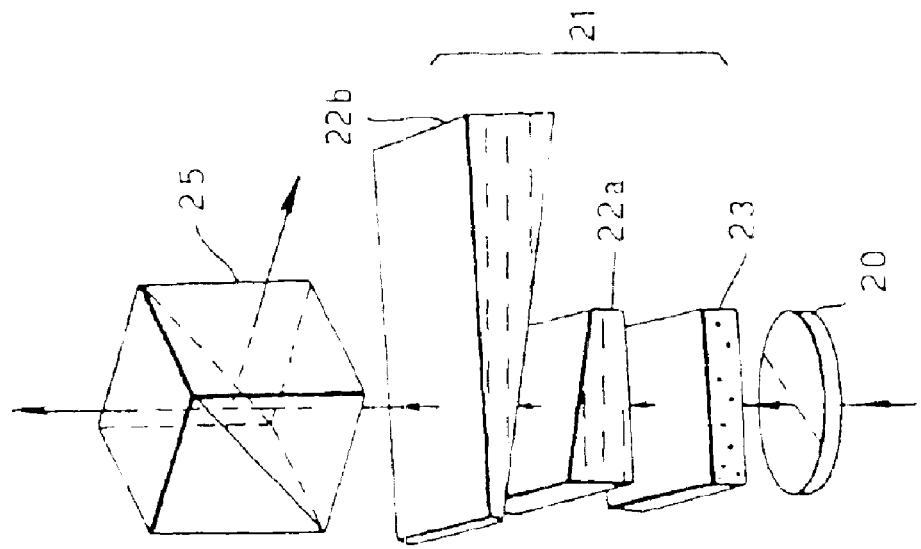
FIG. 3 shows an interferometer similar to that of FIG. 2 in which a polarizing beamsplitter is substituted for the analyzer.
Figure 2:
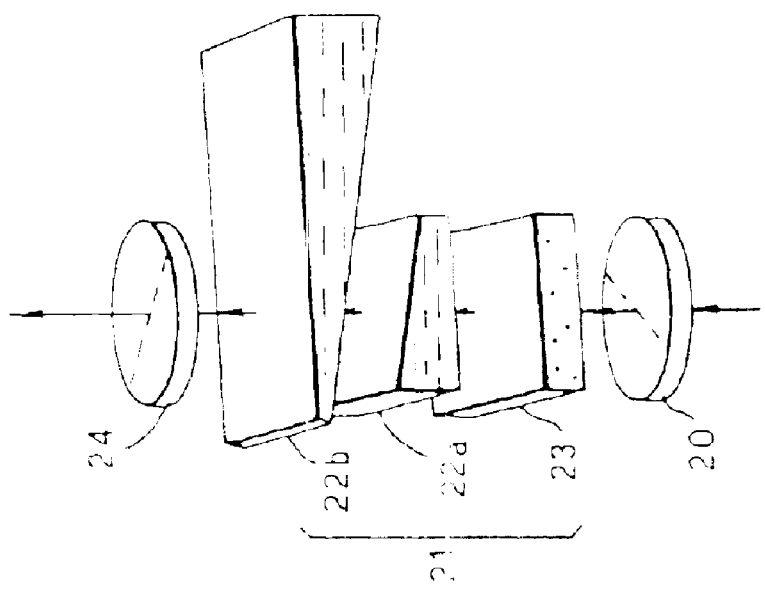
FIG. 2 shows an interferometer suitable for relatively high intensities of light (e.g. for measurements of absorption spectra of stained microscope specimens).
Figure 4:
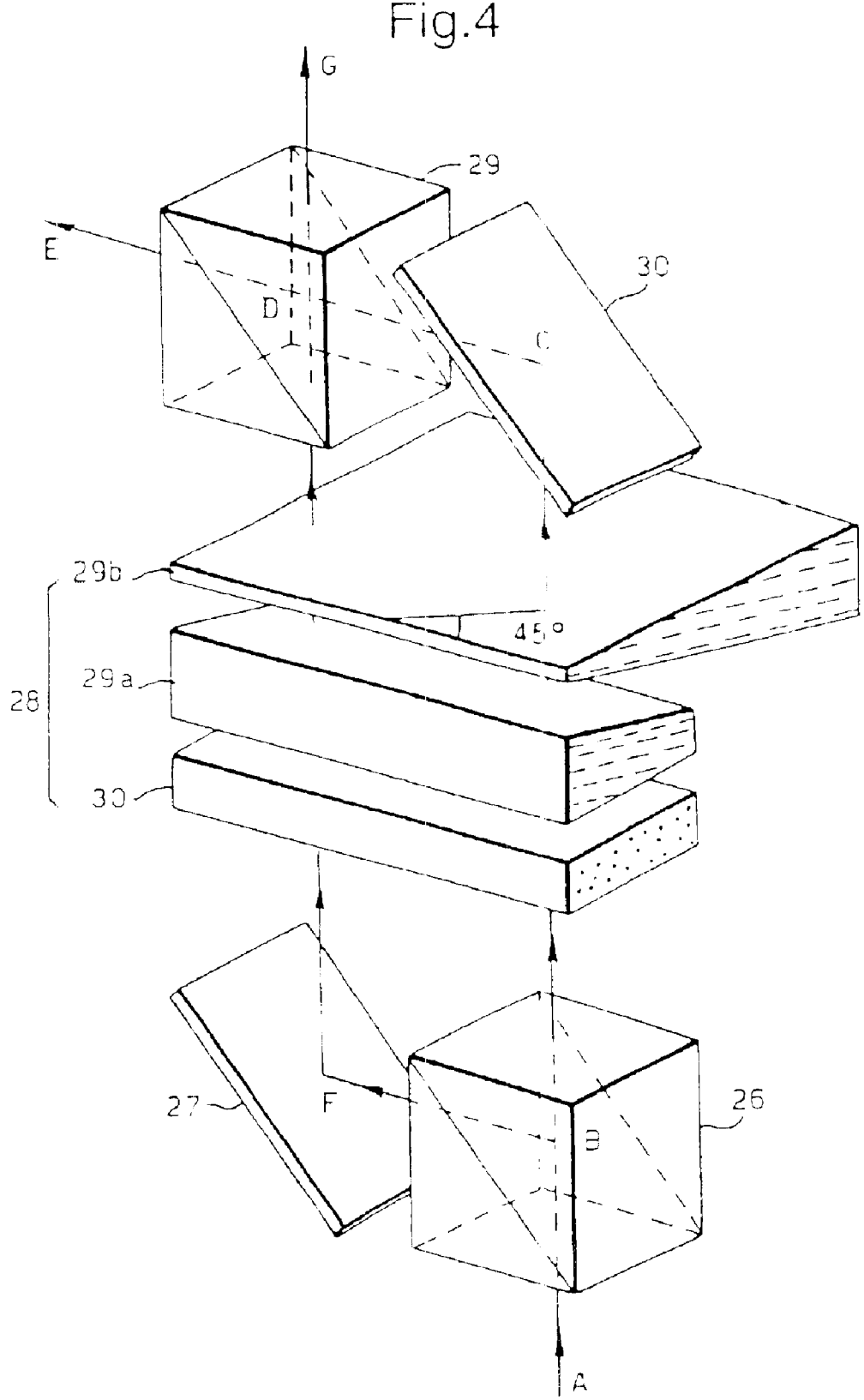
FIG. 4 shows a more preferred polarizing interferometer suitable for lower intensities of light.

FIGS. 2–4 show interferometers which may suitably be used in the scanning spot microscopes of FIGS. 1a–e.

In the interferometer shown in FIG. 2, a birefringent device which is a Soleil compensator 21 is placed between two polarizing filters 20, 24 and thereby introduces a given path difference into the optical path. Light passes first through the polarizer filter 20 and then through the Soleil compensator 21, having a fixed wedge 22a of birefringent material such as quartz or calcite placed adjacent to a movable wedge 22b. The practical slow directions in the two wedges are parallel so that their net effect is that of a single birefringent retarding plate of variable thickness. A stationary uniformly-thick bias plate 23 of similar material, but with its slow direction perpendicular to that of the other two, is used to achieve zero retardation at a certain position of the movable wedge 22b. The analyzer filter 24 produces interference between the differently-polarized components of light emerging from the Soleil compensator 21.

In this form of interferometer, to produce increments of optical path difference, the movable wedge 22b is translated by corresponding increments in the direction of its long axis. The Soleil compensator 21 can be arranged with the optical slow direction of the wedges 22a and 22b orthogonal to the direction of translation and at 45° to the directions of polarization or polarizer and analyzer filters 20, 24, which are themselves "crossed". The average transmission efficiency of such an interferometer at any wavelength is less than 25% because of absorption in the polarizing filters.

The interferometer shown in FIG. 3 is similar to that shown in FIG. 2, but a polarizing beamsplitter 25 is substituted for the analyzer filter 24. Consequently there are two output beams, so two interferograms are obtained as the movable wedge 22b is translated, one being the complementary of the other (i.e. one darkens in proportion to the brightening of the other). The average transmission efficiency can now approach 50%.

In a more preferred interferometer shown in FIG. 4, the input beam is divided at a polarizing cube beamsplitter 26. Almost all the energy of the beam is thus divided between two beams and a minimum is lost (chiefly by reflection). Both beams are rendered parallel by the action of a reflector 27 and pass through a Soleil compensator 28. One then passes to a polarizing cube beamsplitter 29 and the other to the polarizing cube beamsplitter 29 via a reflector 30. Two output beams pass to detectors which are not shown in the figure. The Soleil compensator 28 is adjusted by translating a movable wedge 29b in a direction perpendicular to its thin edge. The Soleil compensator is provided with the slow optical directions of the movable wedge element 29b, its fixed wedge 29a and bias plate 30 at an angle of 45° to the translation direction. This enables identical thicknesses of wedge to be presented to the two beams and the slow direction of the birefringent material is at the optimal orientation of 45° to the polarization direction of the beamsplitters.

With the movable wedge 29b set to provide an optical path difference of zero, light path ABCDG produces an intensity at G which is reduced to a minimum, or 'zero order black' condition when white light is input, because the cube beamsplitters 26, 29 act as "crossed" polarizers with respect to this path. This is also true for path ABFDG. At other settings of the Soleil compensator, light of particular wavelengths is passed in identical fashion along these two paths, which therefore results in a summing of intensities at G. A similar situation applies for paths ABCDE and ABFDE, except that in this case the cube beamsplitters act as 'parallel' polarizers so that the intensity of the light is as a maximum at E when it is a minimum at G. Over a period of time during which the Soleil device is progressively adjusted, the two outputs or the interferometer are used to construct two complementary interferograms consisting of the recorded intensities.

What is claimed is:

1. A scanning spot microscope for performing Fourier spectral analysis, said microscope comprising (i) means for performing a repeatable scanning operation which includes scanning an incident light spot to successive locations of a specimen, (ii) an interferometer placed across an optical light path of the microscope, the interferometer including a birefringent device between polarizing devices in the path and introducing a given path difference, said birefringent device comprising means for maintaining said given path difference during each scanning operation and for varying said given path difference between scanning operations, and (iii) means for receiving and recording an optical signal due to the incident light spot from each specimen location, such that the optical signals relating to the specimen locations and the values of the given path difference are recordable.

2. A scanning spot microscope according to claim 1, in which the birefringent device comprises a Soleil compensator having a fixed wedge, a bias plate and a movable wedge translatable relative to fixed path-defining optics, and the optical slow direction of the movable wedge is at 45° to its direction of translation.

3. A scanning spot microscope according to claim 1, in which the birefringent device is provided between cube polarizing beamsplitters.

4. A scanning spot microscope according to claim 1, further comprising a marker on a movable optical component, the position of the marker indicating the amount of the given path difference.

5. An interferometer comprising a birefringent device that splits a light beam into components with a given path difference between said components, said birefringent device comprising means for maintaining said given path difference during a single scanning operation and for varying said given path difference between scanning operations.

6. A method of performing Fourier spectral analysis in which an incident light spot performs a repeatable scanning operation which includes being scanned to successive locations of a specimen, a birefringent device between polarizing devices introduces a given path difference into an optical path of light incident to or received from the specimen, the given path difference is maintained during each scanning operation but is varied between scanning operations, and the optical signals relating to the specimen locations and the values of the given path difference are recordable.

* * * * *